Dec. 19, 1967   J. E. RUSSELL   3,358,465
ABSORPTION REFRIGERATION SYSTEMS
Filed July 15, 1966   2 Sheets-Sheet 1

INVENTOR.
JACK E. RUSSELL.
BY Frank N. Decker Jr.
ATTORNEY.

Dec. 19, 1967  J. E. RUSSELL  3,358,465
ABSORPTION REFRIGERATION SYSTEMS
Filed July 15, 1966  2 Sheets-Sheet 2

INVENTOR.
JACK E. RUSSELL.
BY Frank N. Decker Jr.
ATTORNEY.

United States Patent Office 3,358,465
Patented Dec. 19, 1967

3,358,465
ABSORPTION REFRIGERATION SYSTEMS
Jack E. Russell, Indianapolis, Ind., assignor to Carrier Corporation, Syracuse, N.Y., a corporation of Delaware
Filed July 15, 1966, Ser. No. 565,588
12 Claims. (Cl. 62—101)

This invention relates to absorption refrigeration systems of the type employing a solution pump.

Absorption refrigeration systems generally comprise a high pressure side including a generator and a condenser, and a low pressure side including an evaporator and an absorber. It is necessary to provide some type of solution transfer mechanism to transfer weak absorbent solution from the low side of the system to the high side of the system where it is reconcentrated. A reciprocating piston solution pump or a hydraulically actuated diaphragm pump may be used for this purpose. However, these and other types of pulsating pump transfer devices are sometimes noisy in operation.

Another problem in the operation of an absorption refrigeration system is the generation therein of noncondensible gases, such as hydrogen, which may have a detrimental effect on the performance of the absorber. It is customary to provide some means to retain the noncondensible gases out of circulation in the absorption machine so that they are not permitted to accumulate in the absorber. It is often difficult to effectively separate the noncondensible gases from the absorbent solution on the high pressure side of the system because they have a tendency to remain suspended in the solution in the form of fine bubbles which freely pass through the system to the absorber along with the absorbent solution. Accumulation or storage of the noncondensible gases on the low pressure side of the system, where separation may be more readily accomplished, may result in requiring an undesirably large storage mechanism because the gas occupies a much greater volume than it would if it were stored on the high pressure side of the system.

It is a principal object of this invention to provide an improved absorption refrigeration system of the type employing a pulsating pump which is quiet in operation.

It is a further object of this invention to employ the noncondensible gases in an absorption refrigeration machine to quite a solution pump.

It is a still further object of this invention to provide an improved separation means for removing noncondensible gases from the solution circulating in an absorption refrigeration machine.

In accordance with this invention, a phase separation apparatus is disposed adjacent the outlet of the absorbent solution pump on the high pressure side of the system. The phase separation apparatus comprises a separation vessel having a packing material therein and a gas storage zone in communication with the separation vessel for storing the noncondensible gases. The phase separation apparatus is designed so that the volume of noncondensible gases which is stored in the gas storage zone is used to cushion the pulsations of absorbent solution at the discharge of the solution pump thereby quieting the operation of the system.

These and other objects of this invention will become more readily apparent by reference to the following specification and attached drawings wherein.

Figure 1:
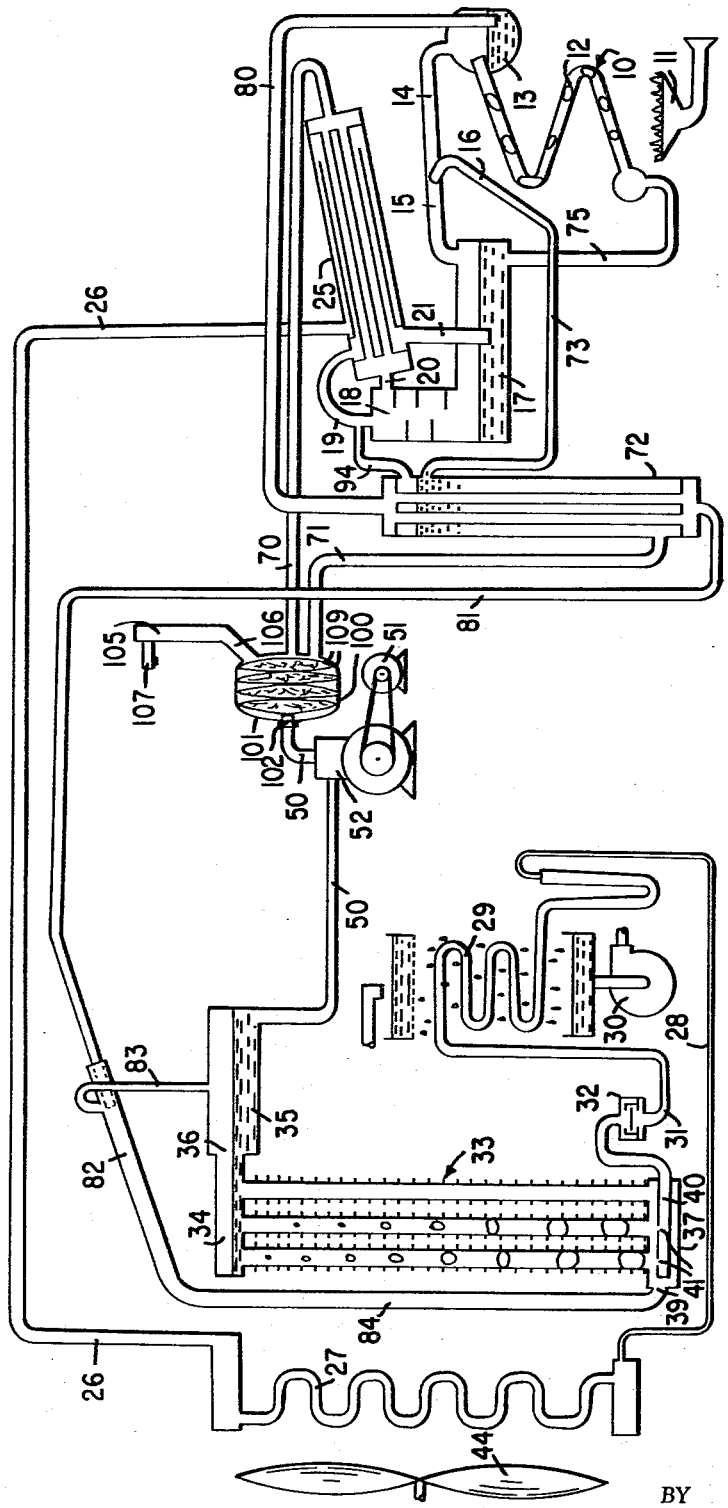
FIGURE 1 shows a schematic diagram of an absorption refrigeration system employing a phase separation apparatus in accordance with this invention.

Referring particularly to the drawing, there is provided a generator section 10 having a heat source 11, such as a gas fired burner. Absorbent solution having refrigerant absorbed or dissolved therein is supplied to the generator section and flows through generator tubes 12, which are heated by burner 11. Heating of the solution causes the refrigerant to be vaporized or boiled out of the absorbent solution. The resulting mixture of vaporized refrigerant and hot absorbent solution is passed into separation chamber 13.

A suitable absorbent for a refrigeration system of the type herein described is water, and a suitable refrigerant is ammonia. As used in this description, the absorbent solution which is collected in separation chamber 13 may be thought of as being a relatively strong solution because the solution is strong in absorbing power. Conversely, the absorbent solution passed to the generator may be thought of as being a relatively weak solution because it has a substantial quantity of refrigerant absorbed therein and the solution is therefore weak in absorbing power.

Since the absorbent, which may be water, and the refrigerant, which may be ammonia, are both volatile, some absorbent vapor is carried into vapor passage 14 along with the refrigerant vapor which has been distilled from the weak absorbent solution passed into the generator section. This mixture of absorbent and refrigerant vapor passes through a preanalyzer section or passage 15. The mixture of vapor flows concurrently with weak solution passed into the preanalyzer section from a weak solution line 16. The resulting gas and liquid contact in the preanalyzer section gives rise to a mass and heat transfer effect by which some of the absorbent vapor, which is relatively less volatile than the refrigerant vapor and therefore is more easily condensed, is condensed, thereby purifying the refrigerant vapor.

The refrigerant vapor is then passed along with the condensed absorbent solution into generator reservoir 17, which contains a quantity of absorbent solution in the bottom thereof. The refrigerant vapor passes over the top of the absorbent solution in generator reservoir 17 and up through analyzer section 18. Weak solution passes from a weak solution passage 20 over a series of plates or other suitable analyzer packing material in contact with the refrigerant vapor. A mass and heat transfer again takes place in anlyzer section 18 to a further purify the refrigerant vapor by condensing the relatively less volatile absorbent vapor.

The purified refrigerant vapor is then passed from the analyzer section through vapor passage 19 into rectifier section 25. Rectifier section 25 comprises a heat exchanger wherein relatively cool weak solution is passed through the heat exchanger and out weak solution passage 20 in heat exchange relation with the refrigerant vapor. The cool weak solution therefore condenses further absorbent vapor from the refrigerant vapor and the condensed absorbent solution is passed through a drain passage 21 in the heat exchanger to generator reservoir 17.

The purified refrigerant vapor is then passed through vapor passage 26 into condenser section 27 of the absorption refrigeration system. Air or other suitable cooling fluid is passed over the exterior of the heat exchange tubes which form condenser section 27 to cool and condense the refrigerant vapor passed thereto.

The condensed refrigerant liquid passes through a restriction device 28, such as a capillary tube, and into the coil of a chiller section 29. Water or other heat exchange fluid to be cooled is passed over the exterior of the coil in chiller section 29 and heat is extracted from the heat exchange fluid which is then passed by pump 30 to a suitable location to provide the desired refrigeration effect in the region to be refrigerated or air conditioned. The heat extracted from the heat exchange fluid is absorbed by the refrigerant liquid causing the refrigerant to again vaporize in the coil of chiller section 29.

The vaporized refrigerant is then passed through passage 31 having a check valve 32 therein to absorber section 33. Absorber section 33 comprises an upper header 34 having an outlet passage 36 for discharging weak absorbent solution into inlet tank 35. Absorber section 33 is also provided with a lower header 37 and a plurality of absorber tubes or passages, generally designated 38, having open ends communicating with the upper and lower headers. Absorber tubes 38 permit the flow of absorbent solution between upper and lower headers 34 and 37.

Preferably, absorber tubes 38 are spaced from one another and provided with suitable fins so that air or other ambient cooling fluid may be passed over the absorber tubes to cool the absorbent solution therein. It will be appreciated that a single fan 44 may be used to pass air over absorber tubes 38 and the heat exchange coil or tubes in condenser section 27, if desired.

A refrigerant vapor inlet distributor 40 is provided in lower header 37 and is connected to refrigerant vapor line 31 to admit refrigerant vapor into the open ends of certain predetermined absorber tubes 38 through orifice 41 in the distributor.

In operation, the absorber tubes 38 having associated adjacent inlet orifices have a mixture of refrigerant vapor and absorbent solution flowing through them from lower header 37 toward upper header 34. As the mixture of vapor and solution rises upwardly in absorber tubes 38, the refrigerant vapor is absorbed into the absorbent solution so that very little, if any, refrigerant vapor reaches upper header 34. At the same time, the absorber tubes 38 which do not have adjacent refrigerant vapor orifices are permitted to carry absorbent solution downwardly from upper header 34 to lower header 37 in a controlled recirculation pattern throughout the absorber. By controlling and optimizing the pattern of recirculation within the absorber, it is assured that all of the absorber tubes into which vapor is injected function to efficiently absorb vapor.

The weak absorbent solution having dissolved therein considerable refrigerant vapor is passed through outlet 36 of absorber section 33 into inlet tank 35, as previously explained. From inlet tank 35, the weak solution flows through passage 50 and solution pump 52 to phase separation apparatus 100. Pump 52 may be a piston pump which is belt-driven by an electric motor 51 or may be of any suitable type such as a hydraulically actuated diaphragm pump. A receiver (not shown) may also be placed in line 50 to prevent the pump from running dry.

The weak solution is divided into two portions in phase separation apparatus 100. The first portion of the weak solution flows through passage 70 through the interior of rectifier 25, passage 20 and analyzer 18 into generator reservoir 17, thereby condensing absorbent vapor in the rectifier and analyzer.

The other portion of the weak solution is passed through passage 71 into heat exchanger 72 where it is warmed. After passing through the heat exchanger, the warmed weak solution passes through passage 73 into preanalyzer section 15, where it is additionally warmed and concentrated by condensing some absorbent vapor from the vapor passing through the preanalyzer section from generator section 10 to generator reservoir 17. The weak solution is heated sufficiently in the heat exchanger so as to reach saturation conditions and any flashed refrigerant vapor passes to the rectifier section through line 94.

Solution passage 16 is connected to vapor passage 14 leading from generator section 10 to generator reservoir 17. From heat exchangers 72, the warmed weak solution passes through passage 73 into passage 16 and vapor passage 14. The warmed weak solution passes through preanalyzer section 15 into generator reservoir 17 from which it passes through solution passage 75 to generator tubes 12.

The strong solution which results from the distillation of refrigerant vapor from the weak solution in the generator is collected in separator 13 and passes through passage 80 through the interior of heat exchanger 72, where the hot strong solution is cooled by heat exchange with the relatively cool weak solution passing through line 71. From heat exchanger 72, the strong solution passes through line 81 into the subcooled absorber section 82 and passage 84 to inlet 39 in lower header 37 of absorber section 33. A vent line 83 is provided between vapor space at the top of inlet tank 35 and subcooled absorber section 82 to induce unabsorbed refrigerant vapor in the top of the inlet tank into the cooled strong solution for better cycle efficiency.

In accordance with this invention, a phase separation apparatus 100 is disposed in solution line 50 adjacent the outlet of solution pump 52. Phase separation apparatus 100 comprises a separation vessel 101 having a suitable inlet pipe or passage 102 to admit absorbent solution therein.

A gas storage zone 105 is connected by an upwardly angularly extending passage 106 adjacent the vertically upper portion of vessel 101. A purge valve 107 is preferably attached at the upper portion of gas storage zone 105 to allow the phase separation apparatus to be purged of noncondensible gases when desired, it being appreciated that some gas, even if only refrigerant vapor, should always remain in the gas storage zone to provide a cushion for solution pulsations in vessel 101.

A suitable packing material 109 is disposed within the interior of separation vessel 101. In the embodiment of the invention shown in FIGURE 1, the packing material preferably comprises a plurality of stainless steel wool pads. While four steel wool pads have been found suitable, the thickness of the packing may be experimentally determined for a particular system. The absorbent solution discharged into vessel 101 impinges onto the packing material at a velocity controlled by the restriction offered by inlet pipe 101 which may be experimentally optimized to obtain effective separation of gas from solution.

Pump 52 passes a mixture of absorbent solution and noncondensible gas from the low pressure side of the system to the high side thereof for concentration in the generator.

The packing material is found to assist in the separation of the noncondensible gases from the absorbent solution and to enable the bubble of gas to escape from the solution. It is unexpectedly observed that when a suitable packing material is disposed in the separation vessel, the noncondensible gas tends to separate from the solution and to rise upwardly in the vessel to displace liquid in the gas storage zone.

The presence of the compressible gas in the gas storage zone provides a cushion which dampens the pulsations in the absorbent solution as it is discharged from the solution pump. This provides a significant and material reduction in noise in the absorption refrigeration system.

It will also be observed that in accordance with this invention, the noncondensible gases are stored on the high pressure side of the refrigeration system so that a relatively small volume is required for the storage of the gases. Thus, the phase separation apparatus of this invention serves the function of storing a large volume of noncondensible gases in a small storage chamber under high pressure and at the same time employing the noncondensible gas as a means to quiet the operation of the refrigeration system.

The phase separation apparatus of this invention may also serve the function of splitting the flow of solution into two separate portions, one of which flows through line 70, rectifier 25, and analyzer 18 into generator reservoir 17, and the other of which flows through line 71, heat exchanger 72 and lines 73 and 74 into the generator reservoir. The splitting of solution is achieved by providing two solution outlets from separation vessel 101, of the proper size to meter the solution flowing through lines 70 and 71 in a manner that provides the desired quantity of solution flow in the two paths.

Figure 2:
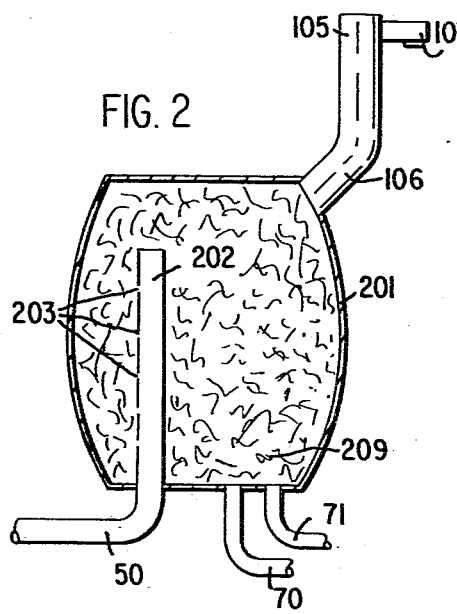
FIGURE 2 illustrates another embodiment of a phase separation apparatus.

FIGURE 2 shows a modified embodiment of a separation vessel suitable for the purposes of this invention. In this and the other figures of the drawing, similar reference characters denote the corresponding parts shown in FIGURE 1. In this embodiment, separation vessel 201 is provided with a vertically extending inlet pipe 202 having a closed end thereon. A plurality of radially horizontal apertures 203 are formed in inlet tube 202 to discharge absorbent solution into a stainless steel wool packing 209 within vessel 201. The size of apertures 203 may be made of such size as is found to provide the optimum velocity to achieve effective separation of gas bubbles and absorbent solution in the separation vessel.

Figure 3:
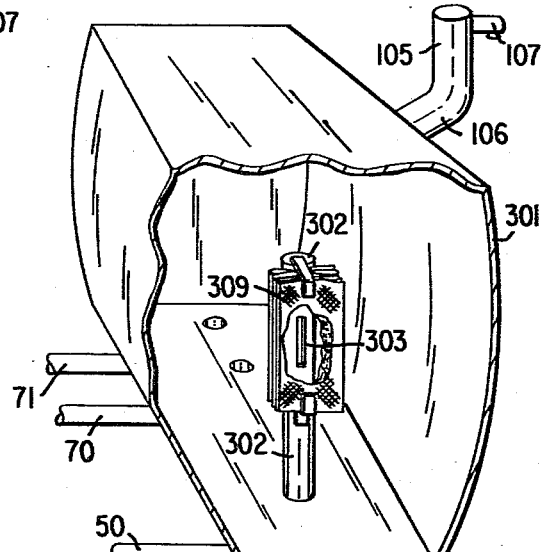
FIGURE 3 illustrates another embodiment of a phase separation apparatus.

Another suitable embodiment of a separation vessel is shown in FIGURE 3 wherein separation vessel 301 is provided with a vertically disposed inlet pipe 302 having a closed end and a vertical slot 303 extending radially horizontally within the separation vessel. A wire gauze screen 309 having a number of folded over thicknesses is secured over the open slot 303 to provide packing to assist in the separation of noncondensible gases and absorbent solution.

Figure 4:
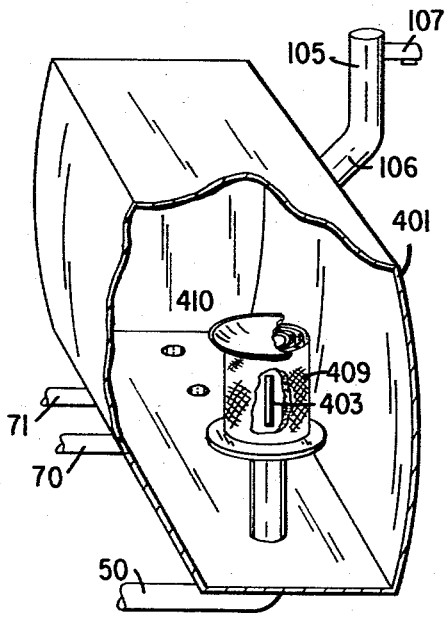
FIGURE 4 illustrates another embodiment of a phase separation apparatus.

FIGURE 4 shows another embodiment of this invention wherein separation vessel 401 has a vertically upwardly extending cylindrical inlet pipe 402 having one or more radially extending horizontal slots 403. A number of layers of wire mesh screen are concentrically wrapped about the end of inlet pipe 402 to provide packing within the separation vessel. The end of inlet pipe 402 is closed by a deflector plate 410. Deflector plate 410 is of greater horizontal size than inlet pipe 402 and has a peripheral portion turned upwardly in separation vessel 401 to form a deflector for passing noncondensible gases upwardly to collection zone 105.

Figure 5:
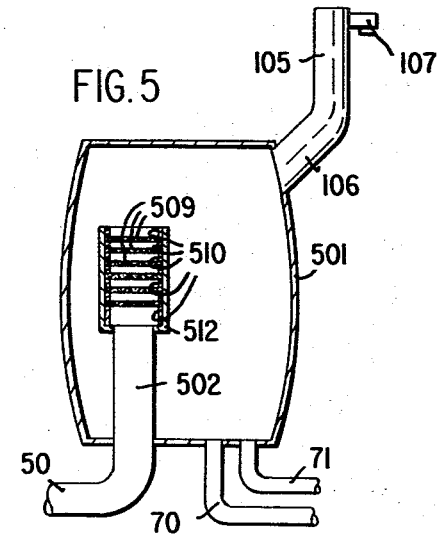
FIGURE 5 illustrates still another embodiment of a phase separation apparatus.

FIGURE 5 shows a still further modified embodiment of this invention wherein a vertically upwardly extending pipe 502 has secured to the end thereof tubular body 512. In this embodiment, the packing comprises a plurality of wire mesh screens 509 which are spaced from each other by spacer washers 511. In this embodiment, the solution passes from line 50 and is ejected vertically upwardly in separation vessel 501 through the layers of wire mesh while the absorbent solution discharged from the vessel passes outwardly from adjacent the bottom thereof through lines 70 and 71 as in the preceding embodiments.

It has been suggested that the packing material in the separation chambers illustrated in the various embodiments of this invention may function to provide surface for the relatively fine gas bubbles entrained in absorbent solution discharged from the solution pump to collect and merge into larger bubbles to more readily pass up to the storage zone. In any event, it has been observed that the presence of packing materials such as illustrated in the drawings is effective to cause separation of the noncondensible gases from absorbent solution in the separation vessel even though the precise explanation for the mechanism of the separation involved may not be fully understood.

Stainless steel or other solution compatible packing materials are suitable, but various other types of packing materials such as glass or plastic beads or raschig rings may be employed as packing if desired. Any of the embodiments of this invention may employ a suitably restricted inlet pipe for discharging absorbent at an accelerated velocity onto the packing material, if desired.

By the application of the method and apparatus of this invention, noncondensible gases in the system are unexpectedly effectively separated and are stored in a minimum volume of space while at the same time they are employed to quiet the operation of the absorption refrigeration system by dampening the oscillations or pulsations of a pulsating pump. In addition, the phase separation apparatus of this invention may serve as a means for splitting the flow of solution for passage to the generator through separate portions of the high pressure side.

It will be appreciated that the foregoing description is illustrative of preferred embodiments of this invention, and that the invention may be otherwise embodied within the scope of the following claims.

I claim:
1. An absorption refrigeration system comprising
 (A) a low pressure side including
  (1) an evaporator for evaporating refrigerant to produce cooling,
  (2) an absorber for absorbing refrigerant vapor formed in said evaporator into an absorbent solution;
 (B) a high pressure side including
  (1) a generator for heating weak absorbent solution to vaporize refrigerant and concentrate said absorbent solution,
  (2) a condenser for liquefying refrigerant vapor formed in said generator;
 (C) a solution pump for passing absorbent solution from said low pressure side to said high pressure side of said system; and
 (D) a phase separation apparatus disposed adjacent the outlet of said solution pump, said phase separation apparatus comprising
  (1) a gas and liquid separation zone including a separation vessel,
  (2) a packing material disposed in said separation vessel,
  (3) inlet passage means for discharging absorbent solution from said pump into said separation vessel,
  (4) a gas storage zone adjacent a vertically upper region of said gas and liquid separation zone and in communication therewith, said gas storage zone being adapted to contain a volume of relatively noncondensible gas separated from absorbent solution in said separation zone and forming a vapor cushion to smooth pulsations in the flow of absorbent solution discharged from said pump to thereby reduce noise in said system, and
  (5) outlet passage means for passing absorbent solution from said phase separation apparatus toward said generator.

2. An absorption refrigeration system as defined in claim 1 wherein said packing material comprises steel wool.

3. An absorption refrigeration system as defined in claim 1 wherein said packing material comprises wire mesh.

4. An absorption refrigeration system as defined in claim 1 wherein said packing material comprises a plurality of spaced layers of wire mesh disposed in the path of flow of absorbent solution into said phase separation apparatus.

5. An absorption refrigeration system as defined in claim 1 wherein said packing material comprises a plurality of layers of wire mesh secured over an opening in said inlet passage for discharging absorbent solution into said phase separation apparatus.

6. An absorption refrigeration system as defined in claim 1 wherein said inlet passage means comprises a cylindrical pipe having a closed end and a radial opening therein, and wherein said packing material comprises a wire mesh spirally wound about the openings in said inlet pipe.

7. An absorption refrigeration system as defined in claim 1 including a restricted solution inlet means for discharging an accelerated stream of absorbent solution into said phase separation apparatus, said restricted solution inlet means being disposed to direct the discharge of absorbent solution onto said packing material.

8. An absorption refrigeration system as defined in claim 1 wherein said inlet passage means extends in a vertical direction and absorbent solution is discharged radially from said inlet passage means in a substantially horizontal direction.

9. An absorption refrigeration system as defined in claim 1 wherein said inlet passage means extends in a vertical direction and absorbent solution is discharged axially from said inlet passage in a substantially vertical direction.

10. An absorption refrigeration system as defined in claim 1 wherein said outlet passage means comprises a plurality of absorbent solution passages extending from said separation vessel and said separation vessel comprises a solution splitting device to divide the flow of absorbent solution passing from said separation vessel between a plurality of separate solution passages for flow toward said generator.

11. An absorption refrigeration system as defined in claim 1 including a purge valve disposed in said gas storage zone for discharging noncondensible gas from said system upon opening of said purge valve.

12. A method of operating an absorption refrigeration system having a low pressure side and a high pressure side, of the type which employs a solution pump to pass absorbent solution from the low pressure side to the high pressure side of the system, said method comprising the steps of (A) pumping a mixture of absorbent solution and noncondensible gas from the low pressure side of said system to the high pressure side of said system by operating said pump;

(B) separating noncondensible gas from absorbent solution discharged from said pump; and (C) collecting the separated noncondensible gas in a gas storage zone in communication with absorbent solution discharged from said pump, and employing the collected noncondensible gas as a vapor cushion to smooth the pulsations in the solution discharged from said pump to quiet the operation of said system.

References Cited

UNITED STATES PATENTS

| 2,363,440 | 11/1944 | Roswell | 62—475 |
| 3,140,591 | 7/1964 | Brown et al. | 62—476 |

LLOYD L. KING, *Primary Examiner.*